(12) United States Patent
Chen et al.

(10) Patent No.: US 11,281,079 B2
(45) Date of Patent: Mar. 22, 2022

(54) ADJUSTING SUPPORT AND PROJECTOR

(71) Applicant: APPOTRONICS CORPORATION LIMITED, Shenzhen (CN)

(72) Inventors: Chanhao Chen, Guangdong (CN); Yi Li, Guangdong (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 129 days.

(21) Appl. No.: 16/613,136

(22) PCT Filed: Jul. 28, 2017

(86) PCT No.: PCT/CN2017/094805
§ 371 (c)(1),
(2) Date: Jan. 8, 2020

(87) PCT Pub. No.: WO2018/209813
PCT Pub. Date: Nov. 22, 2018

(65) Prior Publication Data
US 2021/0080813 A1   Mar. 18, 2021

(30) Foreign Application Priority Data
May 17, 2017   (CN) .......................... 201710346632.7

(51) Int. Cl.
*G03B 21/14*   (2006.01)
*F16M 7/00*    (2006.01)
(Continued)

(52) U.S. Cl.
CPC ............. *G03B 21/145* (2013.01); *F16M 7/00* (2013.01); *F16M 11/046* (2013.01); *F16M 11/10* (2013.01); *F16M 2200/08* (2013.01)

(58) Field of Classification Search
CPC ........ G03B 21/145; G03B 21/14; F16M 7/00; F16M 11/046; F16M 11/10; F16M 2200/08; F16M 11/18
(Continued)

(56) References Cited

U.S. PATENT DOCUMENTS 1,417,639 A  *  5/1922  Sterner ................ A47B 91/028
                                                    248/188.4
4,991,805 A  *  2/1991  Solak ....................... F16M 7/00
                                                    248/188.4
(Continued)

FOREIGN PATENT DOCUMENTS

CN   102654724 A    9/2012
CN   204705806 U   10/2015
(Continued)

OTHER PUBLICATIONS

English Translation of CN-102654724-A, Coretronic Corp (Year: 2012).*
(Continued)

*Primary Examiner* — Muhammad Ijaz
(74) *Attorney, Agent, or Firm* — Marshall, Gerstein & Borun LLP

(57) ABSTRACT

The present disclosure provides an adjustment bracket and a projector, and relates to the technical field of projection devices. The adjustment bracket includes: an adjustment roller; an adjustment foot; and an adjustment foot gear. An adjustment gear is fixed to the adjustment roller, the adjustment gear is engaged with the adjustment foot gear, internal threads are provided at a center position of the adjustment foot gear, an outer wall of the adjustment foot is provided with external threads, and the adjustment foot is connected to the adjustment foot gear by the internal threads and the external threads. A pitch angle or height of an electronic device such as a projector can be adjusted by a combination
(Continued)

of a gear transmission and threads, and a structure thereof is simple and an operation thereof is convenient.

18 Claims, 3 Drawing Sheets

(51) Int. Cl.
  F16M 11/04 (2006.01)
  F16M 11/10 (2006.01)
(58) Field of Classification Search
  USPC .......... 248/688, 615, 673, 677, 188.8, 188.9
  See application file for complete search history.

(56) References Cited

U.S. PATENT DOCUMENTS

| | | | |
|---|---|---|---|
| 6,485,144 B1 | 11/2002 | Liao | |
| 9,790,722 B2* | 10/2017 | Sun | F25D 23/028 |
| 2002/0001067 A1* | 1/2002 | Tachibana | G03B 21/145 |
| | | | 353/101 |
| 2003/0136887 A1 | 7/2003 | Gabriel | |
| 2005/0109896 A1 | 5/2005 | Smith et al. | |
| 2005/0247834 A1* | 11/2005 | Thuelig | D06F 39/125 |
| | | | 248/188.4 |
| 2012/0120575 A1* | 5/2012 | Song | F16M 11/10 |
| | | | 361/679.01 |
| 2012/0132765 A1* | 5/2012 | Huang | G03B 21/145 |
| | | | 248/188.4 |
| 2014/0209781 A1* | 7/2014 | Weber | H02K 7/1166 |
| | | | 248/560 |
| 2018/0223582 A1* | 8/2018 | Shin | F25D 23/028 |
| 2018/0368574 A1* | 12/2018 | Cattaneo | A47B 91/028 |
| 2021/0080813 A1* | 3/2021 | Chen | F16M 7/00 |

FOREIGN PATENT DOCUMENTS

| | | |
|---|---|---|
| CN | 105093797 A | 11/2015 |
| CN | 205229648 U | 5/2016 |
| CN | 205923528 U | 2/2017 |
| CN | 206056213 U | 3/2017 |
| FR | 2809828 A1 | 12/2001 |
| JP | 2001343709 A | 12/2001 |
| JP | 2004085726 A | 3/2004 |
| JP | 2008275932 A | 11/2008 |

OTHER PUBLICATIONS

International Search Report for International Application No. PCT/CN2017/094805, dated Feb. 2, 2018.
Written Opinion for International Application No. PCT/CN2017/094805, dated Jan. 23, 2018.
Communication pursuant to Article 94(3) EPC for EPO Application No. 17909744.9, dated Aug. 6, 2021.
Notice of Reason for Refusal for Japanese Applicaiton No. 2019-563500, dated Dec. 24, 2020.

* cited by examiner

ADJUSTING SUPPORT AND PROJECTOR

TECHNICAL FIELD

The present disclosure relates to the technical field of electronic devices, and in particular, to an adjustment bracket and a projector.

BACKGROUND

Projectors are more and more frequently used in education, home, and engineering demonstrations, and people use the projectors to project pictures or videos on a screen or wall to obtain a magnified display. In practical applications, due to limitation of a use environment, it is usually necessary to adjust a pitch angle or height of the projector to obtain a better display effect.

In the prior art, the projector is provided with a supporting foot at a bottom position that can be rotated to adjust a height, and then the pitch angle or height of the projector can be adjusted by changing a telescopic length of the foot relative to the projector. However, such a design generally requires the user to lift the projector before adjusting the foot, which results in an inconvenient and inaccurate adjustment, and it easily leads to deviation of a placement position of the projector, which is not conducive to adjustment during the projection process.

SUMMARY

The present disclosure provides an adjustment bracket, including: an adjustment roller; an adjustment foot; and an adjustment foot gear. An adjustment gear is fixed to the adjustment roller, the adjustment gear is engaged with the adjustment foot gear, the adjustment foot gear is provided with internal threads at a center position thereof, the adjustment foot is provided with external threads on an outer wall thereof, and the adjustment foot and the adjustment foot gear are connected through a screw joint of the internal threads and the external threads.

In another aspect, the present disclosure provides a projector including a housing, a projection mechanism provided in the housing, and an adjustment bracket. The adjustment bracket includes an adjustment roller, an adjustment foot, and an adjustment foot gear. An adjustment gear is fixed to the adjustment roller, the adjustment gear is engaged with the adjustment foot gear, the adjustment foot gear is provided with internal threads at a center position thereof, the adjustment foot is provided with external threads on an outer wall thereof, and the adjustment foot and the adjustment foot gear are connected through a screw joint of the internal threads and the external threads.

In yet another aspect, the present disclosure further provides an adjustment bracket, including an adjustment roller, an adjustment foot gear, and an adjustment foot connected to the adjustment foot gear through threads. An adjustment gear is fixed to the adjustment roller, the adjustment gear is engaged with the adjustment foot gear, the adjustment gear drives the adjustment foot gear to rotate with respect to the adjustment foot, such that the adjustment foot gear is adjusted to move up and down relative to an axis of the adjustment foot.

The present disclosure provides an adjustment bracket and a projector. The adjustment bracket includes: an adjustment roller; an adjustment foot; and an adjustment foot gear, wherein an adjustment gear is fixed to the adjustment roller, the adjustment gear is engaged with the adjustment foot gear, the adjustment foot gear, at a center position thereof, is provided with internal threads, the adjustment foot, on an outer wall thereof, is provided with external threads, and the adjustment foot and the adjustment foot gear are connected through a screw joint of the internal threads and the external threads. According to the present disclosure, a pitch angle or height of an electronic device such as a projector can be adjusted by a combination of a gear transmission and threads, and a structure thereof is simple and an operation thereof is convenient.

REFERENCE SIGNS

1 adjustment roller; 2 adjustment foot; 3 adjustment foot gear; 4 adjustment gear; 5 lower case; 6 arcuate structure; 7 gear cover; 8 first screw; 9 second screw; 10 roller decoration part; 11 silicone pad.

The purpose, functional characteristics and advantages of the present disclosure will be described in details with reference to the embodiments and accompanying drawings.

DESCRIPTION OF EMBODIMENTS

It should be understood that the embodiments described herein are merely for illustrating the present disclosure and not intended to limit the present disclosure.

In the following description, terms such as "module", "component", or "unit" used for indicating elements are merely for illustration, but not have specific meanings. Therefore, "module" and "component" can represent the same element.

A main purpose of the present disclosure is to provide an adjustment bracket and a projector, which can achieve an adjustment of a pitch angle or height of an electronic device such as projector by a combination of a gear transmission and threads, a simple structure, and a convenient operation.

Example 1

Figure 1:
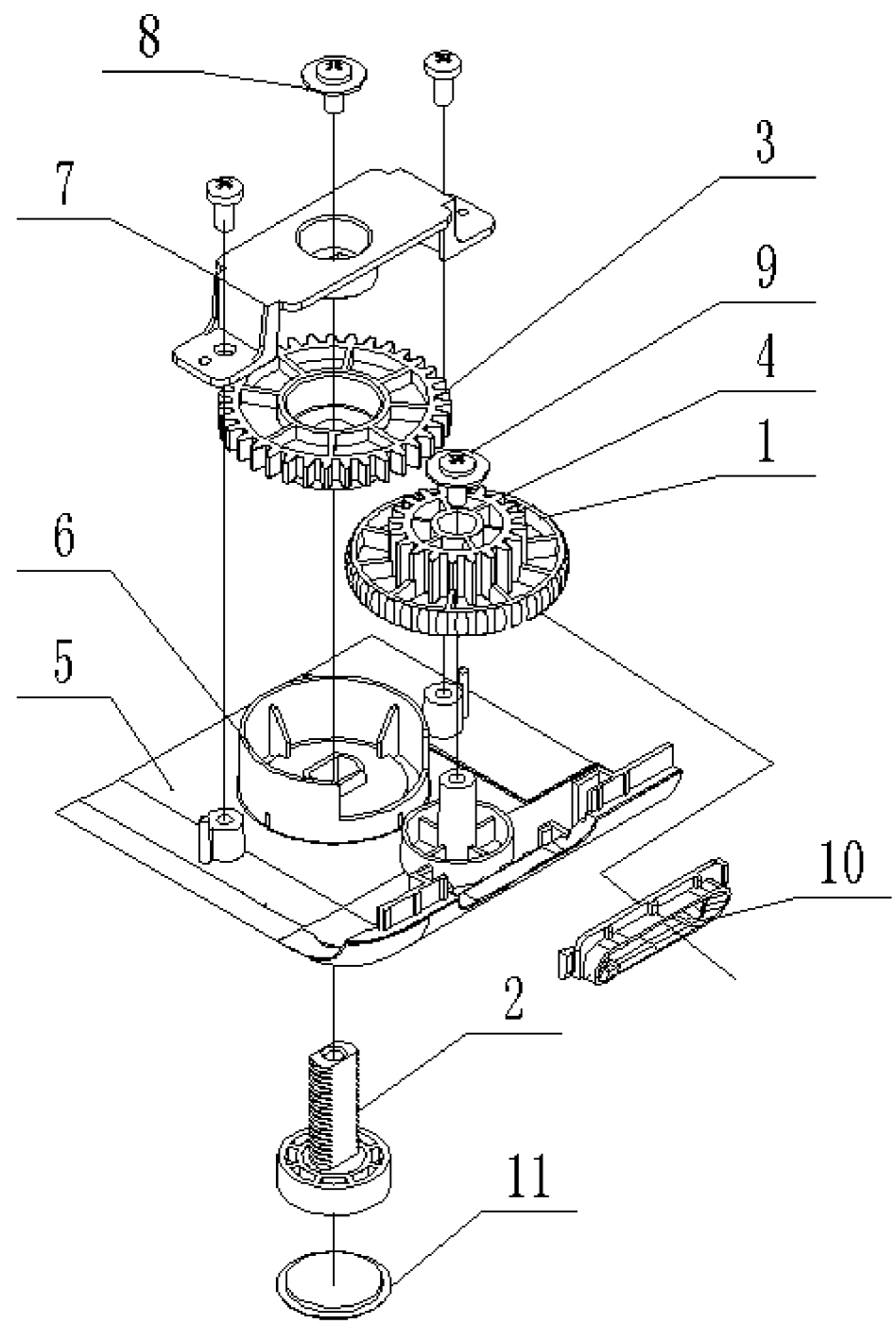
FIG. 1 is a structural exploded view of an adjustment bracket provided by Example 1 of the present disclosure.

As shown in FIG. 1, in this embodiment, an adjustment bracket is provided, and the adjustment bracket includes: an adjustment roller 1, an adjustment foot 2, and an adjustment foot gear 3. An adjustment gear 4 is fixed to the adjustment roller 1, and the adjustment gear 4 is engaged with the adjustment foot gear 3. The adjustment foot gear 3 is provided with internal threads at its central position, and the adjustment foot 2 is provided with external threads at its outer wall. The adjustment foot 2 and the adjustment foot gear 3 are connected through a screw joint of the internal and external threads.

In the present embodiment, a pitch angle or height of an electronic device such as a projector can be adjusted by a combination of a gear transmission and threads, thereby achieving a simple structure and a convenient operation.

As shown in FIG. 1, taking a projector as an example, the outer wall of the adjustment foot 2 is provided with a limit portion and a transmission portion, and the external threads are provided on the transmission portion. A first through hole is provided at the center position of the adjustment foot gear 3, the internal thread is provided on an inner wall of a lower portion of the first through hole, and a recessed portion is provided at an upper portion of the first through hole.

As shown in FIG. 1, in the present embodiment, the limit portion is formed as two mutually parallel flat surfaces, and the transmission portion is formed as two arcuate surfaces connecting the two mutually parallel flat surfaces, so that the outer wall of the adjustment foot is formed as a non-circumferential structure. Such a non-circumferential structure maintains the adjustment foot 2 in a non-rotation state, and the adjustment foot 2 is only allowed to move up and down through threads structure to adjust the height of the projector, thereby adjusting the pitch angle of the projector.

In another embodiment, the limit portion may be formed as a polygon surface, an arcuate surface, or the like, and the transmission portion may be formed as a spiral surface.

In this embodiment, an upper case (not shown) and a lower case 5 are provided, and the adjustment roller 1 is disposed at a connection between the upper case and the lower case 5, thereby avoiding a process of grooving and opening a hole in the case. Moreover, such an arrangement is an aesthetic design, and blocks a dust entering path. In this way, a slot for receiving the adjustment roller 1 can be provided only in the lower case 5 or the upper case, thereby reducing a processing complexity.

Figure 2:
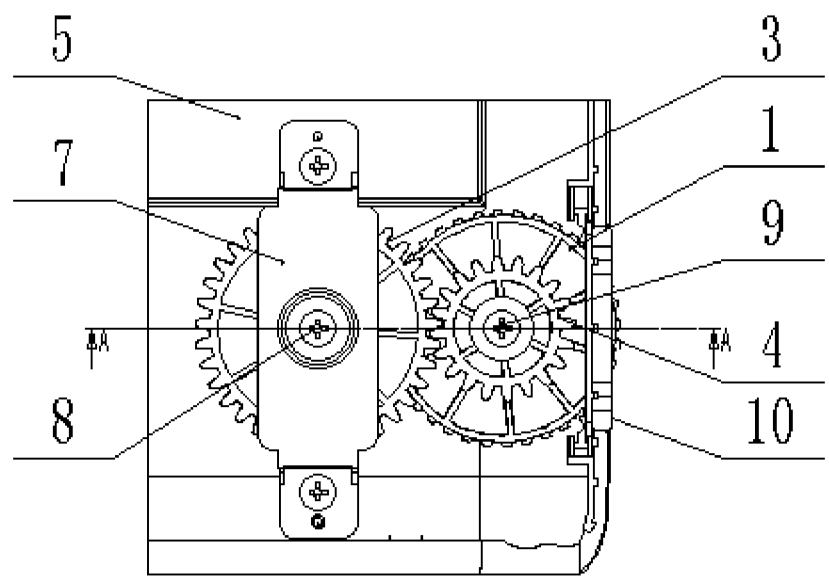
FIG. 2 is a top view of the adjustment bracket provided by Example 1 of the present disclosure.
Figure 3:
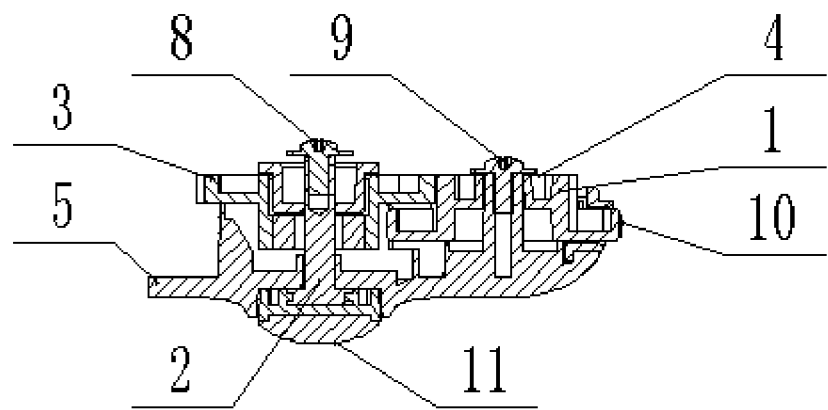
FIG. 3 is a cross-sectional view along A-A of FIG. 2.

As shown in FIG. 2 and FIG. 3, in this embodiment, the adjustment roller 1 is disposed at a side wall of the projector. Most part of the adjustment roller 1 is disposed inside the case of the projector, while only a small part of the adjustment roller 1 is exposed to the operator who operates the roller to rotate, and the adjustment foot gear 3 is driven to rotate by the adjustment gear 4 that is formed in one piece with the adjustment roller 1. When the adjustment foot gear 3 rotates, the adjustment foot gear 3 is fixed in a vertical direction, and thus the adjustment foot gear 3 can only rotate. Since the limit portion of adjustment foot 2 is limited and fixed, the adjustment foot 2 is fixed in a rotation direction and cannot rotate. Therefore, the adjustment foot gear 3 together with a bottom of the case move up and down relative to the adjustment foot 2, thereby adjusting the telescopic length of the adjustment foot 2.

In the present embodiment, the lower case 5 is provided with a protruding arcuate structure 6, and the arcuate structure 6 is fixed and connected to a lower portion of the adjustment foot gear 3. An upper portion of the adjustment foot gear 3 is provided with a gear cover 7, the gear cover 7 is provided with an indention structure adapted to the recessed portion, and the indention structure abuts against the recessed portion.

In this embodiment, the lower case 5 is provided with a second through hole adapted to a shape of the outer wall of the adjustment foot 2, and the adjustment foot 2 penetrates the lower case 5 via the second through hole. The outer wall of the adjustment foot 2 is provided with a limit protrusion at a lower end thereof. An upper end of the adjustment foot 2 is connected to a first screw 8, and the first screw 8 is movably arranged in the indention structure by a shim.

In this embodiment, the first screw 8 is a mechanical flange nail. The shape of the outer wall of the adjustment foot 2 is respectively adapted to a lower portion of the first through hole and to the second through hole.

Figure 4:
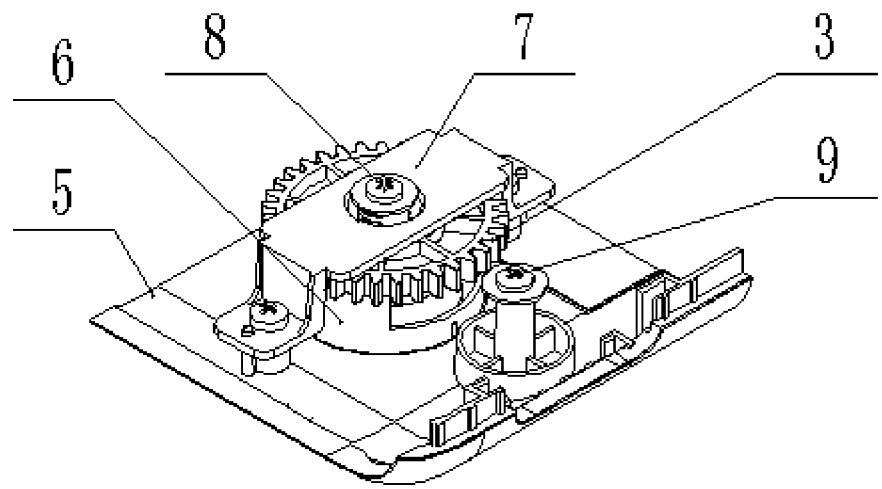
FIG. 4 is an assembly schematic diagram of an adjustment foot gear provided by Example 1 of the present disclosure.

As shown in FIG. 4, in this embodiment, the arcuate structure 6, as a lower limitation, limits the adjustment foot gear 3, and the arcuate structure 6 is formed in an arcuate shape instead of a circle shape, so as to provide a receiving space for the adjustment roller 1. The gear cover 7, as an upper limitation, limits the adjustment foot gear 3, and the gear cover 7 is provided with the indention structure and thus provided with a receiving space. Through a design of the recessed portion and the indention structure, there is some space which allows the first screw 8 connected to the adjustment foot 2 moves upward but not exceeds too much from a top surface of the recessed portion and the indention structure, thereby avoiding a design in which a lot of space is reserved for a protrusion of the adjustment foot 2 during a height adjustment process. Further, through the limitations at the lower portion and at the upper portion, when the adjustment roller 1 drives the adjustment gear 4 to rotate, the adjustment gear 4 drives the adjustment foot gear 3 to rotate relative to the adjustment foot 2 so as to move up and down along an axis of the adjustment foot 2. In this way, the adjustment foot gear 3 acts on the arcuate structure on the gear cover 7 or the lower case 5, such that the lower case 5 moves up and down relative to the adjustment foot 2 so as to adjust the telescopic length of the adjustment foot 2 relative to the lower case 5, thereby adjusting the pitch angle or height of electronic devices such as the projector.

This recess design also provides the adjustment roller 1 with a rotating space, so that an adjustment roller portion of the adjustment roller 1 can be as close as possible to a lower position, close to the lower case 5 (i.e., the adjustment gear 4 is located at an upper position), so that a joint between the upper case and the lower case 5 of the projector is arranged as lower as possible. In this way, an aesthetic design is achieved, and it is convenient for maintenance and disassembly, as the lower case 5 is arranged lower and the parts close to a side of the projector can be maintained in an easier way. Without this recess design, under the same length of the adjustment foot 2 and the same adjustment range of the adjustment foot 2, it is inevitable that a gear surface of the adjustment foot gear 3 will move upward and then the adjustment roller 1 will also move upward.

Figure 5:
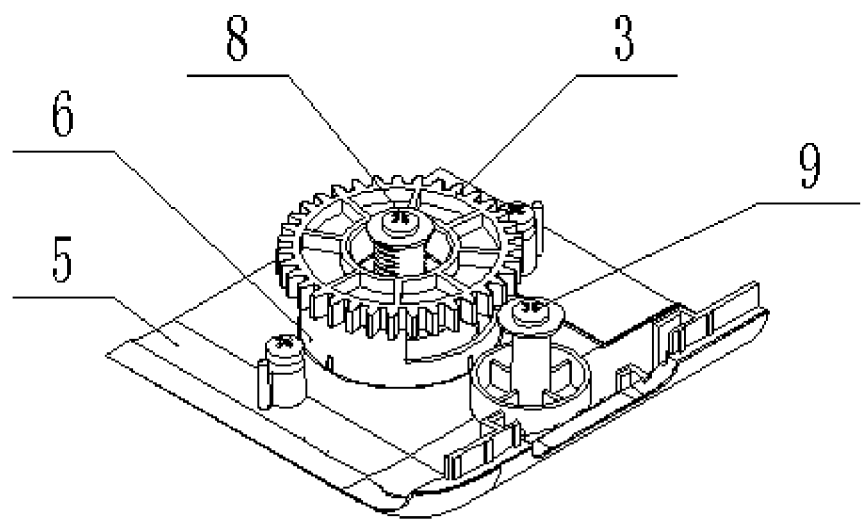
FIG. 5 is a schematic diagram of a fixation structure provided by Example 1 of the present disclosure.

As shown in FIG. 5, in this embodiment, the lower case 5 is provided with a fixation structure for fixing the adjustment roller 1.

In this embodiment, the fixation structure includes a circular base and a cylindrical support structure. A bottom end of the cylindrical support structure is fixed and connected to the circular base. A top end of the cylindrical support structure is provided with a second screw 9.

In this embodiment, the second screw 9 is a flange self-tapping screw.

In this embodiment, a through hole is provided at a center position of the adjustment roller 1, and an inner diameter of the through hole is in interference fit with an outer diameter of the cylindrical support structure.

In this embodiment, a roller decoration part 10 is provided outside the adjustment roller 1, and the roller decoration part 10 partially covers a periphery of the adjustment roller 1. Moreover, the roller decoration part 10 is provided with an opening for exposing and adjusting the adjustment roller 1. The roller decoration part 10 has both decorative and dustproof functions.

In this embodiment, the lower end of the adjustment foot is further provided with a silicone pad 11.

In this embodiment, the adjustment bracket may be provided at left and right sides of the projector, respectively, or is merely provided at a front side.

Example 2

In this embodiment, a projector is provided. The projector includes the adjustment bracket described in Example 1 and conventional structures of the projector, such as an optical structure, a light source structure, a heat dissipation structure and the like. In this embodiment, adjustment of the pitch angle or height of an electronic device such as a projector is achieved by a combination of a gear transmission and threads, and a structure thereof is simple and an operation thereof is convenient.

It should be noted that, in the present disclosure, terms "including", "comprising" or any other variants thereof are intended to express non-exclusive inclusion. Therefore, a process, method, item or device including or comprising a series of elements includes or comprises not only the mentioned elements, but also other elements that are not explicitly listed, or elements inherent to such a process, method, item or device. Without specific restrictions, an element limited by an expression "including a/an . . . " does not mean that there are no other identical elements in this process, method, item, or device that includes this element.

The sequence numbers of the examples of the present disclosure described above are merely for description, and do not represent superiority or inferiority of these embodiments.

Through the description of the above embodiments, those skilled in the art can clearly understand that the methods of the embodiments described above can be implemented by means of software and necessary universal hardware platforms, or only by means of hardware, but in many cases the former is a better implementation manner. Based on such understanding, an essential part of the technical solution of the present disclosure or a part that contributes to the prior art can be embodied in a form of a software product, which is stored in a storage medium (such as ROM/RAM, magnetic disk, optical disc) and includes several instructions for causing a terminal device (such as mobile phone, computer, server, air conditioner, network device) to execute the methods described in the embodiments of the present disclosure.

The above descriptions are merely embodiments of the present disclosure, and shall not limit a scope of the present disclosure. Any equivalent structure or equivalent process modified using the specification and companying drawings of the present disclosure, or directly or indirectly applied to other related technical fields shall fall within the scope of the present disclosure.

What is claimed is:

1. An adjustment bracket, comprising:
an adjustment roller;
an adjustment foot; and
an adjustment foot gear,
wherein an adjustment gear is fixed to the adjustment roller, the adjustment gear is engaged with the adjustment foot gear, the adjustment foot gear is provided with internal threads at a center position thereof, the adjustment foot is provided with external threads on an outer wall thereof, and the adjustment foot and the adjustment foot gear are connected through a screw joint of the internal threads and the external threads,
wherein the outer wall of the adjustment foot is a non-circumferential structure, and
wherein the adjustment bracket further comprises a lower case, the lower case is provided with a second through hole having a shape adapted to fit with a shape of the outer wall of the adjustment foot, and the adjustment foot penetrates the lower case via the second through hole.

2. The adjustment bracket according to claim 1, wherein the outer wall of the adjustment foot comprises a limit portion and a transmission portion, and the external threads are provided on the transmission portion.

3. The adjustment bracket according to claim 1, wherein a first through hole is provided at the center position of the adjustment foot gear, the internal threads are provided on an inner wall of a lower portion of the first through hole, and a recessed portion is provided at an upper portion of the first through hole.

4. The adjustment bracket according to claim 3, further comprising an upper case, wherein the lower case is provided with a protruding arcuate structure, and the protruding arcuate structure is a lower limitation of the adjustment foot gear; an upper portion of the adjustment foot gear is provided with a gear cover, the gear cover is provided with an indention structure adapted to the recessed portion, and the indention structure abuts against the recessed portion.

5. The adjustment bracket according to claim 4, wherein the gear cover is an upper limitation of the adjustment foot gear.

6. The adjustment bracket according to claim 1, wherein the adjustment gear is arranged at an upper end of the adjustment roller and formed into one piece with the adjustment roller.

7. The adjustment bracket according to claim 1, wherein the adjustment gear has a smaller diameter than the adjustment roller.

8. The adjustment bracket according to claim 4, wherein the adjustment roller is arranged at a connection between the upper case and the lower case.

9. The adjustment bracket according to claim 1, wherein the outer wall of a lower portion of the adjustment foot is provided with a limit protrusion.

10. The adjustment bracket according to claim 1, wherein an upper end of the adjustment foot is connected to a first screw, and the first screw is movably arranged in an indention structure.

11. The adjustment bracket according to claim 4, wherein the lower case is provided with a fixation structure for fixing the adjustment roller, and the fixation structure comprises a circular base and a cylindrical support structure; a bottom end of the cylindrical support structure is fixed and connected to the circular base, and a top end of the cylindrical support structure is provided with a second screw.

12. The adjustment bracket according to claim 10, wherein a though hole is provided at a center position of the adjustment roller, and an inner diameter of the through hole is in interference fit with an outer diameter of a cylindrical support structure.

13. The adjustment bracket according to claim 1, wherein a roller accessory is provided outside the adjustment roller.

14. The adjustment bracket according to claim 13, wherein the roller accessory covers a part of a periphery of the adjustment roller exposed to outside of a case, and the roller accessory is provided with an opening for exposing the adjustment roller for adjustment.

15. The adjustment bracket according to claim 1, wherein a lower end of the adjustment foot is further provided with a silicone pad.

16. A projector, comprising:
a housing;
a projection mechanism provided in the housing; and
an adjustment bracket, wherein the adjustment bracket comprises:
an adjustment roller;
an adjustment foot; and
an adjustment foot gear,
wherein an adjustment gear is fixed to the adjustment roller, the adjustment gear is engaged with the adjustment foot gear, the adjustment foot gear is provided with internal threads at a center position thereof, the adjustment foot is provided with external threads on an outer wall thereof, and the adjustment foot and the adjustment foot gear are connected through a screw joint of the internal threads and the external threads,
wherein the outer wall of the adjustment foot is a non-circumferential structure, and
wherein the adjustment bracket further comprises a lower case, the lower case is provided with a second through hole having a shape adapted to fit with a shape of the outer wall of the adjustment foot, and the adjustment foot penetrates the lower case via the second through hole.

17. An adjustment bracket, comprising:
an adjustment roller;
an adjustment foot gear;
an adjustment foot connected to the adjustment foot gear through threads; and
a lower case,
wherein an adjustment gear is fixed to the adjustment roller, the adjustment gear is engaged with the adjustment foot gear, the adjustment gear drives the adjustment foot gear to rotate with respect to the adjustment foot, such that the adjustment foot gear is adjusted to move up and down relative to an axis of the adjustment foot,
wherein the adjustment foot has a non-circumferential profile, and
wherein the lower case is provided with a second through hole having a shape adapted to fit with the profile of the adjustment foot such that the adjustment foot penetrates the lower case via the second through hole to move up and down relative to the axis of the adjustment foot without rotation movement.

18. The adjustment bracket according to claim 13, wherein a first through hole is provided at a center position of the adjustment foot gear, an inner wall of a lower portion of the first through hole is provided with internal threads, the outer wall of the adjustment foot is provided with the external threads, and the adjustment foot gear and the adjustment foot are connected through the screw joint of the internal threads and the external threads; and
wherein the internal threads are provided on an inner wall of a lower portion of the first through hole, and a recessed portion is provided at an upper portion of the first through hole.

* * * * *